(12) United States Patent
Hallock et al.

(10) Patent No.: US 12,286,044 B2
(45) Date of Patent: Apr. 29, 2025

(54) METHOD AND APPARATUS FOR PRODUCING A VEHICLE INTERIOR COMPONENT

(71) Applicant: Lear Corporation, Southfield, MI (US)

(72) Inventors: Joshua Hallock, Warren, MI (US); Eric Repke, Milford, MI (US); Mark Karges, Macomb, MI (US); James Gerry Williams, Highland, MI (US); Michelle A. Pereny, Farmington Hills, MI (US); Lisa Swikoski, West Bloomfield, MI (US); Christopher D. Johnson, Novi, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 18/316,353

(22) Filed: May 12, 2023

(65) Prior Publication Data

US 2024/0375567 A1   Nov. 14, 2024

(51) Int. Cl.
*B60N 2/58* (2006.01)

(52) U.S. Cl.
CPC .................................. *B60N 2/5891* (2013.01)

(58) Field of Classification Search
None
See application file for complete search history.

(56) References Cited

U.S. PATENT DOCUMENTS

| | | | |
|---|---|---|---|
| 1,621,008 A | 3/1927 | Anthony | |
| 2,130,935 A | 9/1938 | Thompson | |
| 2,188,995 A | 2/1940 | Avery et al. | |
| 2,630,938 A * | 3/1953 | Burnett | B65D 25/16 206/521.1 |
| 2,630,968 A | 3/1953 | Muskat | |
| 3,155,363 A | 11/1964 | Lohr | |
| 3,309,052 A | 3/1967 | Borisof | |
| 3,315,283 A | 4/1967 | Larsen | |

(Continued)

FOREIGN PATENT DOCUMENTS

| | | |
|---|---|---|
| AU | 2006227668 A1 | 9/2006 |
| AU | 2003296088 B2 | 9/2008 |

(Continued)

OTHER PUBLICATIONS https://www.youtube.com/watch?v=eFiPBu_fBe4, The Making of a Newton Wovenaire Crib Mattress, Apr. 21, 2016, 3 pages.

(Continued)

*Primary Examiner* — Monica A Huson
*Assistant Examiner* — Kelsey C Grace
(74) *Attorney, Agent, or Firm* — Brooks Kushman P.C.

(57) ABSTRACT

An assembly is provided with a funnel having one or more side walls extending from an entrance to an outlet, and a liner having one or more elastic panels, with the liner extending over an inner surface of the one or more side walls. A system is provided with the assembly, a die, a fluid bath, and at least one hose to direct fluid from the fluid bath onto the liner of the assembly. A method includes covering an inner surface of a funnel with a liner comprising one or more elastic panels, wetting the liner, and forming a stranded mesh material member by extruding material from a die and through the funnel. A stranded mesh material member is provided and formed using the method.

19 Claims, 4 Drawing Sheets

(56) References Cited

U.S. PATENT DOCUMENTS

| | | | |
|---|---|---|---|
| 3,630,572 A | 12/1971 | Homier | |
| 3,689,620 A * | 9/1972 | Miyazaki | D01D 5/06 |
| | | | 264/180 |
| 3,733,658 A | 5/1973 | Mitchell | |
| 3,794,378 A | 2/1974 | Haslam et al. | |
| D239,147 S | 3/1976 | Karlsen | |
| 3,961,823 A | 6/1976 | Caudill, Jr. | |
| 4,031,579 A | 6/1977 | Larned | |
| 4,287,657 A | 9/1981 | Andre et al. | |
| 4,396,823 A | 8/1983 | Nihei et al. | |
| 4,476,594 A | 10/1984 | McLeod | |
| 4,563,387 A | 1/1986 | Takagi et al. | |
| 4,663,211 A | 5/1987 | Kon | |
| 4,751,029 A | 6/1988 | Swanson | |
| 4,859,516 A | 8/1989 | Yamanaka et al. | |
| 4,860,402 A | 8/1989 | Dichtel | |
| 4,876,135 A | 10/1989 | McIntosh | |
| 4,881,997 A | 11/1989 | Hatch | |
| 4,900,377 A | 2/1990 | Redford et al. | |
| 4,913,757 A | 4/1990 | Yamanaka et al. | |
| 4,933,224 A | 6/1990 | Hatch | |
| 4,952,265 A | 8/1990 | Yamanaka et al. | |
| 4,953,770 A | 9/1990 | Bond, Sr. | |
| 5,003,664 A | 4/1991 | Wong | |
| 5,007,676 A | 4/1991 | Lien | |
| 5,016,941 A | 5/1991 | Yokota | |
| 5,092,381 A | 3/1992 | Feijin et al. | |
| 5,095,592 A | 3/1992 | Doerfling | |
| 5,313,034 A | 5/1994 | Grimm et al. | |
| 5,378,296 A | 1/1995 | Vesa | |
| 5,381,922 A | 1/1995 | Gladman | |
| 5,405,178 A | 4/1995 | Weingartner et al. | |
| D364,269 S | 11/1995 | Sabosky | |
| 5,464,491 A | 11/1995 | Yamanaka | |
| 5,482,665 A | 1/1996 | Gill | |
| 5,492,662 A | 2/1996 | Kargol et al. | |
| 5,494,627 A | 2/1996 | Kargol et al. | |
| 5,536,341 A | 7/1996 | Kelman | |
| 5,551,755 A | 9/1996 | Lindberg | |
| 5,569,641 A | 10/1996 | Smith | |
| 5,586,807 A | 12/1996 | Taggart | |
| 5,587,121 A | 12/1996 | Vesa | |
| 5,620,759 A | 4/1997 | Insley et al. | |
| 5,622,262 A | 4/1997 | Sadow | |
| 5,639,543 A | 6/1997 | Isoda et al. | |
| 5,669,129 A | 9/1997 | Smith et al. | |
| 5,669,799 A | 9/1997 | Moseneder et al. | |
| 5,679,296 A | 10/1997 | Kelman et al. | |
| 5,733,825 A | 3/1998 | Martin et al. | |
| 5,788,332 A | 8/1998 | Hettinga | |
| 5,811,186 A | 9/1998 | Martin et al. | |
| 5,819,408 A | 10/1998 | Catlin | |
| 5,833,321 A | 11/1998 | Kim et al. | |
| 5,966,783 A | 10/1999 | Genereux et al. | |
| 6,057,024 A | 5/2000 | Mleziva et al. | |
| 6,063,317 A | 5/2000 | Carroll, III | |
| 6,131,220 A | 10/2000 | Morimura | |
| 6,272,707 B1 | 8/2001 | Robrecht et al. | |
| 6,283,552 B1 | 9/2001 | Halse et al. | |
| 6,302,487 B1 | 10/2001 | Fujita et al. | |
| 6,347,790 B1 | 2/2002 | Nishibori et al. | |
| 6,378,150 B1 | 4/2002 | Minegishi et al. | |
| D461,746 S | 8/2002 | Olson et al. | |
| 6,457,218 B1 | 10/2002 | Lawrence | |
| 6,558,590 B1 | 5/2003 | Stewart | |
| 6,668,429 B2 | 12/2003 | Fujisawa et al. | |
| 6,766,201 B2 | 7/2004 | Von Arx et al. | |
| 6,776,201 B2 * | 8/2004 | Willis | B67C 11/02 |
| | | | 141/337 |
| 6,918,146 B2 | 7/2005 | England | |
| D523,330 S | 6/2006 | Mattesky | |
| 7,073,230 B2 | 7/2006 | Boville | |
| 7,100,978 B2 | 9/2006 | Ekern et al. | |
| D530,192 S | 10/2006 | Becerra | |
| 7,128,371 B2 | 10/2006 | Kawasaki et al. | |
| 7,141,768 B2 | 11/2006 | Malofsky et al. | |
| 7,158,968 B2 | 1/2007 | Cardno | |
| D538,704 S | 3/2007 | Kaminski | |
| 7,290,300 B1 | 11/2007 | Khambete | |
| 7,377,762 B2 | 5/2008 | Nishibori et al. | |
| 7,427,103 B2 | 9/2008 | Weber | |
| 7,481,489 B2 | 1/2009 | Demick | |
| 7,506,939 B2 | 3/2009 | Borckschneider et al. | |
| 7,547,061 B2 | 6/2009 | Horimatsu et al. | |
| 7,549,707 B2 | 6/2009 | Brennan et al. | |
| 7,622,179 B2 | 11/2009 | Patel | |
| 7,625,629 B2 | 12/2009 | Takaoka | |
| 7,669,925 B2 | 3/2010 | Beck et al. | |
| 7,707,743 B2 | 5/2010 | Schindler et al. | |
| 7,771,375 B2 | 8/2010 | Nishibori et al. | |
| 7,837,263 B2 | 11/2010 | Booth et al. | |
| 7,892,991 B2 | 2/2011 | Yamanaka et al. | |
| D636,293 S | 4/2011 | Dolce et al. | |
| 7,946,649 B2 | 5/2011 | Galbreath et al. | |
| 7,993,734 B2 | 8/2011 | Takaoka | |
| 8,052,212 B2 | 11/2011 | Backendorf | |
| 8,056,263 B2 | 11/2011 | Schindler et al. | |
| 8,226,882 B2 | 7/2012 | Takaoka | |
| 8,240,759 B2 | 8/2012 | Hobl et al. | |
| 8,276,235 B2 | 10/2012 | Naughton | |
| 8,277,210 B2 | 10/2012 | Takaoka | |
| D677,193 S | 3/2013 | MacDonald | |
| 8,563,121 B2 | 10/2013 | Takaoka | |
| 8,563,123 B2 | 10/2013 | Takaoka | |
| 8,568,635 B2 | 10/2013 | Takaoka | |
| 8,721,825 B2 | 5/2014 | Takaoka | |
| 8,752,902 B2 | 6/2014 | Labish | |
| 8,757,996 B2 | 6/2014 | Takaoka | |
| 8,828,293 B2 | 9/2014 | Takaoka | |
| 8,882,202 B2 | 11/2014 | Petzel et al. | |
| 8,932,692 B2 | 1/2015 | Pearce | |
| 9,004,591 B2 | 4/2015 | Murasaki et al. | |
| 9,097,921 B2 | 8/2015 | Ogasawara et al. | |
| 9,168,854 B2 | 10/2015 | Ursino et al. | |
| 9,169,585 B2 | 10/2015 | Takaoka | |
| 9,174,404 B2 | 11/2015 | Takaoka | |
| 9,179,748 B2 | 11/2015 | Esti | |
| 9,194,066 B2 | 11/2015 | Takaoka | |
| 9,283,875 B1 | 3/2016 | Pellettiere | |
| 9,334,593 B2 | 5/2016 | Sasaki | |
| 9,434,286 B2 | 9/2016 | Klusmeier et al. | |
| 9,440,390 B2 | 9/2016 | Takaoka | |
| 9,447,522 B2 | 9/2016 | Zikeli et al. | |
| 9,456,702 B2 | 10/2016 | Miyata et al. | |
| 9,528,209 B2 | 12/2016 | Takaoka | |
| 9,561,612 B2 | 2/2017 | Takaoka | |
| 9,598,803 B2 | 3/2017 | Takaoka | |
| 9,615,670 B2 | 4/2017 | Takaoka | |
| 9,616,790 B2 | 4/2017 | Stankiewicz et al. | |
| 9,617,021 B2 | 4/2017 | McCorkle et al. | |
| 9,669,744 B2 | 6/2017 | Cao et al. | |
| 9,688,007 B2 | 6/2017 | Cheng | |
| 9,708,067 B2 | 7/2017 | Wilson et al. | |
| 9,751,442 B2 | 9/2017 | Smith | |
| 9,771,174 B2 | 9/2017 | Murray | |
| D798,875 S | 10/2017 | Huang | |
| 9,789,796 B1 | 10/2017 | White | |
| 9,809,137 B2 | 11/2017 | Kheil | |
| 9,918,559 B2 | 3/2018 | Osaki | |
| 9,918,560 B2 | 3/2018 | Osaki | |
| 9,925,899 B2 | 3/2018 | Mogi et al. | |
| 9,938,649 B2 | 4/2018 | Taninaka et al. | |
| 9,970,140 B2 | 5/2018 | Taninaka et al. | |
| 10,118,323 B2 | 11/2018 | Fujita et al. | |
| 10,150,320 B2 | 12/2018 | Ellringmann et al. | |
| 10,231,511 B2 | 3/2019 | Guyan et al. | |
| 10,233,073 B2 | 3/2019 | Takaoka | |
| 10,266,977 B2 | 4/2019 | Takaoka | |
| 10,316,444 B2 | 6/2019 | Wakui et al. | |
| 10,328,618 B2 | 6/2019 | Takaoka | |
| 10,343,565 B2 | 7/2019 | Baek et al. | |
| 10,398,236 B2 | 9/2019 | Achten et al. | |
| 10,399,848 B2 | 9/2019 | Kristo et al. | |
| 10,414,305 B2 | 9/2019 | Ishii et al. | |

(56) References Cited

U.S. PATENT DOCUMENTS

| | | |
|---|---|---|
| 10,421,414 B2 | 9/2019 | Townley et al. |
| 10,501,598 B2 | 12/2019 | Baldwin et al. |
| 10,604,040 B2 | 3/2020 | Clauser et al. |
| 10,618,799 B2 | 4/2020 | Shah et al. |
| 10,730,419 B2 | 8/2020 | Low et al. |
| 10,736,435 B2 | 8/2020 | Duncan et al. |
| 10,744,914 B2 | 8/2020 | Baek et al. |
| 10,750,820 B2 | 8/2020 | Guyan |
| RE48,225 E | 9/2020 | Kheil et al. |
| 10,780,805 B2 | 9/2020 | Kamata |
| 10,806,272 B2 | 10/2020 | Ando et al. |
| 10,821,862 B2 | 11/2020 | Russman et al. |
| 10,843,600 B2 | 11/2020 | Booth et al. |
| 10,882,444 B2 | 1/2021 | Townley et al. |
| 10,889,071 B2 | 1/2021 | Kojima et al. |
| D909,792 S | 2/2021 | Pound |
| 10,934,644 B2 | 3/2021 | Taninaka et al. |
| 11,007,761 B2 | 5/2021 | Ben-Daat et al. |
| 11,168,421 B2 | 11/2021 | Wakui et al. |
| 11,186,336 B2 | 11/2021 | Primeaux et al. |
| D948,764 S | 4/2022 | Peterson |
| 11,369,532 B2 | 6/2022 | Wilson et al. |
| 11,383,625 B2 | 7/2022 | Voigt et al. |
| 11,554,699 B2 | 1/2023 | Liau et al. |
| D1,005,380 S | 11/2023 | McWilliams et al. |
| 2002/0101109 A1 | 8/2002 | Stiller et al. |
| 2002/0193221 A1 | 12/2002 | Tisi |
| 2003/0026970 A1 | 2/2003 | Hernandez et al. |
| 2003/0032731 A1 | 2/2003 | Oswald et al. |
| 2003/0061663 A1 | 4/2003 | Lampel |
| 2003/0092335 A1 | 5/2003 | Takaoko |
| 2004/0036326 A1 | 2/2004 | Bajic et al. |
| 2004/0099981 A1 | 5/2004 | Gerking |
| 2004/0126577 A1 | 7/2004 | Lee et al. |
| 2004/0142619 A1 | 7/2004 | Ueno et al. |
| 2004/0255385 A1 | 12/2004 | England |
| 2005/0030011 A1 | 2/2005 | Shimizu et al. |
| 2005/0066423 A1 | 3/2005 | Hogan |
| 2005/0198874 A1 | 9/2005 | Wurm |
| 2005/0238842 A1 | 10/2005 | Schindzielorz et al. |
| 2006/0068120 A1 | 3/2006 | Sreenivasan et al. |
| 2006/0075615 A1 | 4/2006 | Khambete |
| 2006/0116045 A1 | 6/2006 | Nishibori et al. |
| 2006/0198983 A1 | 9/2006 | Patel |
| 2006/0237986 A1 | 10/2006 | Brockschneider et al. |
| 2007/0001336 A1 | 1/2007 | Nishibori et al. |
| 2007/0057414 A1 | 3/2007 | Hartge |
| 2007/0066197 A1 | 3/2007 | Woo et al. |
| 2007/0134464 A1 | 6/2007 | Schindzielorz et al. |
| 2007/0207691 A1 | 9/2007 | Cobbett Wiles et al. |
| 2008/0099458 A1 | 5/2008 | Hilmer |
| 2008/0102149 A1 | 5/2008 | Williams |
| 2008/0203615 A1 | 8/2008 | Brum |
| 2008/0252111 A1 | 10/2008 | Rothkop et al. |
| 2008/0254281 A1 | 10/2008 | Chen et al. |
| 2008/0309143 A1 | 12/2008 | Booth et al. |
| 2009/0008377 A1 | 1/2009 | Nathan et al. |
| 2009/0108494 A1 | 4/2009 | Ito et al. |
| 2009/0152909 A1 | 6/2009 | Andersson |
| 2009/0269570 A1 | 10/2009 | Takaoka |
| 2009/0269571 A1 | 10/2009 | Takaoka |
| 2010/0181796 A1 | 7/2010 | Galbreath et al. |
| 2010/0258334 A1 | 10/2010 | Akaike et al. |
| 2011/0252568 A1 | 10/2011 | Ramp |
| 2011/0278902 A1 | 11/2011 | Galbreath et al. |
| 2011/0316185 A1 | 12/2011 | Takaoka |
| 2012/0042452 A1 | 2/2012 | Takaoka |
| 2012/0104646 A1 | 5/2012 | Takaoka |
| 2012/0112515 A1 | 5/2012 | Labish |
| 2012/0174352 A1 | 7/2012 | Tsunoda |
| 2012/0180939 A1 | 7/2012 | Takaoka |
| 2012/0181841 A1 | 7/2012 | Petzel et al. |
| 2012/0301701 A1 | 11/2012 | Takaoka |
| 2012/0319323 A1 | 12/2012 | Takaoka |
| 2012/0328722 A1 | 12/2012 | Takaoka |
| 2013/0000043 A1 | 1/2013 | Bullard et al. |
| 2013/0020016 A1 | 1/2013 | Takaoka |
| 2013/0137330 A1 | 5/2013 | Grimm |
| 2013/0161858 A1 | 6/2013 | Sasaki |
| 2013/0164123 A1 | 6/2013 | Helmenstein |
| 2013/0189472 A1 | 7/2013 | Takaoka |
| 2013/0200661 A1 | 8/2013 | Klusmeier et al. |
| 2014/0029900 A1 | 1/2014 | Logan, Jr. et al. |
| 2014/0035191 A1 | 2/2014 | Takaoka |
| 2014/0037907 A1 | 2/2014 | Takaoka |
| 2014/0037908 A1 | 2/2014 | Takaoka |
| 2014/0042792 A1 | 2/2014 | Kajiwara |
| 2014/0062161 A1 | 3/2014 | Elenbaas et al. |
| 2014/0138016 A1 | 5/2014 | Takaoka |
| 2014/0167328 A1 | 6/2014 | Petzel |
| 2014/0354029 A1 | 12/2014 | Takaoka |
| 2014/0370769 A1 | 12/2014 | Osaki |
| 2014/0378015 A1 | 12/2014 | Osaki |
| 2015/0072107 A1 | 3/2015 | Fujita et al. |
| 2015/0091209 A1 | 4/2015 | Mueller et al. |
| 2015/0197056 A1 | 7/2015 | Takaoka |
| 2015/0210192 A1 | 7/2015 | Benson et al. |
| 2015/0219136 A1 | 8/2015 | Koelling |
| 2015/0266263 A1 | 9/2015 | Ichikawa |
| 2015/0272332 A1 | 10/2015 | Noguchi et al. |
| 2015/0274048 A1 | 10/2015 | Mogi et al. |
| 2015/0284894 A1 | 10/2015 | Takaoka |
| 2015/0367583 A1 | 12/2015 | Blot et al. |
| 2016/0009209 A1 | 1/2016 | Cao et al. |
| 2016/0010250 A1 | 1/2016 | Taninaka et al. |
| 2016/0023387 A1 | 1/2016 | Takaoka |
| 2016/0032506 A1 | 2/2016 | Takaoka |
| 2016/0051009 A1 | 2/2016 | Kormann et al. |
| 2016/0052433 A1 | 2/2016 | Ono et al. |
| 2016/0052435 A1 | 2/2016 | Nakada |
| 2016/0096462 A1 | 4/2016 | Kromm et al. |
| 2016/0122925 A1 | 5/2016 | Shah et al. |
| 2016/0144756 A1 | 5/2016 | Ito et al. |
| 2016/0157628 A1 | 6/2016 | Khambete et al. |
| 2016/0174725 A1 | 6/2016 | Takaoka |
| 2016/0263802 A1 | 9/2016 | Takaoka |
| 2016/0318428 A1 | 11/2016 | Hugues |
| 2016/0374428 A1 | 12/2016 | Kormann et al. |
| 2017/0043695 A1 | 2/2017 | Kitamoto et al. |
| 2017/0174346 A1 | 6/2017 | Wilson et al. |
| 2017/0181505 A1 | 6/2017 | Burke et al. |
| 2017/0184108 A1 | 6/2017 | Scancarello et al. |
| 2017/0332733 A1 | 11/2017 | Cluckers et al. |
| 2018/0054858 A1 | 2/2018 | Dry |
| 2018/0070736 A1 | 3/2018 | Achten et al. |
| 2018/0086623 A1 | 3/2018 | Takaoka |
| 2018/0147792 A1 | 5/2018 | Kojima et al. |
| 2018/0148312 A1 | 5/2018 | Kojima et al. |
| 2018/0229634 A1 | 8/2018 | Baisch et al. |
| 2018/0332663 A1 | 11/2018 | Lisseman et al. |
| 2019/0002272 A1 | 1/2019 | Kristo et al. |
| 2019/0090656 A1 | 3/2019 | Duncan et al. |
| 2019/0125092 A1 | 5/2019 | Ando et al. |
| 2019/0135199 A1 | 5/2019 | Galan Garcia et al. |
| 2019/0161593 A1 | 5/2019 | Hattori |
| 2019/0232835 A1 | 8/2019 | Murakami |
| 2019/0298072 A1 | 10/2019 | Bhatia et al. |
| 2019/0344691 A1 | 11/2019 | Liau et al. |
| 2019/0351787 A1 | 11/2019 | Lodhia et al. |
| 2019/0357695 A1 | 11/2019 | Achten et al. |
| 2019/0381955 A1 | 12/2019 | Mueller et al. |
| 2019/0390382 A1 | 12/2019 | Rong et al. |
| 2020/0017006 A1 | 1/2020 | Booth et al. |
| 2020/0039399 A1 | 2/2020 | Oomen et al. |
| 2020/0165122 A1 | 5/2020 | Salzmann |
| 2020/0180479 A1 | 6/2020 | Russman et al. |
| 2020/0231428 A1 | 7/2020 | Migneco et al. |
| 2020/0262323 A1 | 8/2020 | Robinson et al. |
| 2020/0315365 A1 | 10/2020 | Kondo et al. |
| 2020/0332445 A1 | 10/2020 | Taninaka et al. |
| 2020/0360210 A1 | 11/2020 | Zoni, III et al. |
| 2021/0024155 A1 | 1/2021 | Primeaux et al. |
| 2021/0046731 A1 | 2/2021 | Nishikawa et al. |
| 2021/0054549 A1 | 2/2021 | Takaoka |

(56) References Cited

U.S. PATENT DOCUMENTS

| | | |
|---|---|---|
| 2021/0074258 A1 | 3/2021 | Konno et al. |
| 2021/0086670 A1 | 3/2021 | Kozlowski et al. |
| 2021/0115607 A1 | 4/2021 | Inoue et al. |
| 2021/0188138 A1 | 6/2021 | Powell et al. |
| 2021/0221266 A1 | 7/2021 | Kozlowski et al. |
| 2021/0291421 A1 | 9/2021 | Nattrass et al. |
| 2021/0299995 A1 | 9/2021 | Sieradzki et al. |
| 2022/0017003 A1 | 1/2022 | Carraro et al. |
| 2022/0017718 A1 | 1/2022 | Martin et al. |
| 2022/0025561 A1 | 1/2022 | Yasui et al. |
| 2022/0169554 A1 | 6/2022 | Du Moulinet D'Hardemare et al. |
| 2022/0178057 A1 | 6/2022 | Maschino et al. |
| 2022/0314851 A1 | 10/2022 | Pereny et al. |
| 2022/0314854 A1 | 10/2022 | Pereny et al. |
| 2022/0370749 A1 | 11/2022 | Dunn et al. |
| 2022/0402416 A1 | 12/2022 | Yang et al. |
| 2022/0410775 A1 | 12/2022 | Aoki et al. |
| 2023/0028451 A1 | 1/2023 | Gastaldi |
| 2023/0173964 A1 | 6/2023 | Webster et al. |
| 2023/0191678 A1 | 6/2023 | Blair et al. |
| 2023/0191680 A1 | 6/2023 | Blair et al. |
| 2023/0322136 A1 | 10/2023 | Wang et al. |

FOREIGN PATENT DOCUMENTS

| | | |
|---|---|---|
| BR | 112014004632 B1 | 4/2021 |
| BR | 112014001603 A2 | 8/2021 |
| BR | 112013020474 B1 | 9/2021 |
| BR | 112017016357 B1 | 3/2022 |
| CA | 3102262 A1 | 12/2019 |
| CN | 100467696 C | 3/2009 |
| CN | 1859862 B | 4/2010 |
| CN | 202509164 U | 10/2012 |
| CN | 105026632 A | 11/2015 |
| CN | 102959151 B | 4/2016 |
| CN | 105612279 A | 5/2016 |
| CN | 103328711 B | 6/2016 |
| CN | 104024511 B | 8/2016 |
| CN | 104582538 B | 9/2016 |
| CN | 104080959 B | 2/2017 |
| CN | 106387295 A | 2/2017 |
| CN | 103998668 B | 3/2017 |
| CN | 103827376 B | 6/2017 |
| CN | 105683434 B | 7/2017 |
| CN | 104285003 B | 9/2017 |
| CN | 105705695 B | 1/2018 |
| CN | 207140883 U | 3/2018 |
| CN | 208484779 U | 2/2019 |
| CN | 109552123 A | 4/2019 |
| CN | 109680413 A | 4/2019 |
| CN | 107614238 B | 2/2020 |
| CN | 107208339 B | 6/2020 |
| CN | 107532357 B | 8/2020 |
| CN | 106231959 B | 10/2020 |
| CN | 111989430 A | 11/2020 |
| CN | 112020578 A | 12/2020 |
| CN | 107708493 B | 1/2021 |
| CN | 107208340 B | 2/2021 |
| CN | 109552123 B | 7/2021 |
| CN | 113166995 A | 7/2021 |
| CN | 213618701 U | 7/2021 |
| CN | 215203369 U | 12/2021 |
| CN | 113930900 A | 1/2022 |
| CN | 109680412 B | 2/2022 |
| CN | 115139881 A | 10/2022 |
| DE | 2626748 A1 | 12/1977 |
| DE | 2626748 C3 | 10/1979 |
| DE | 3127303 A1 | 1/1983 |
| DE | 3037834 C2 | 5/1987 |
| DE | 3690196 C1 | 10/1989 |
| DE | 29822649 U1 | 4/1999 |
| DE | 20100848 U1 | 3/2001 |
| DE | 102004053133 A1 | 5/2006 |
| DE | 202006017670 U1 | 7/2007 |
| DE | 102006020306 A1 | 11/2007 |
| DE | 102008033468 A1 | 2/2009 |
| DE | 112013005643 T5 | 8/2015 |
| DE | 202018104691 U1 | 11/2019 |
| DE | 112019002208 T5 | 1/2021 |
| DE | 102020210092 A1 | 3/2021 |
| DE | 102022107559 A1 | 10/2022 |
| DK | 1832675 T3 | 6/2013 |
| DK | 2772576 T3 | 5/2015 |
| DK | 3255192 T3 | 3/2020 |
| DK | 202370025 A1 | 2/2024 |
| DK | 202370426 A1 | 8/2024 |
| EP | 0145603 A2 | 6/1985 |
| EP | 0240388 A2 | 10/1987 |
| EP | 0370991 A2 | 5/1990 |
| EP | 0392568 A1 | 10/1990 |
| EP | 0805064 A2 | 11/1997 |
| EP | 0890430 A2 | 1/1999 |
| EP | 0926302 A2 | 6/1999 |
| EP | 0894885 B1 | 11/2002 |
| EP | 1586687 A1 | 10/2005 |
| EP | 1270787 B1 | 6/2010 |
| EP | 1858944 B1 | 7/2011 |
| EP | 2532502 A1 | 12/2012 |
| EP | 2565304 A1 | 3/2013 |
| EP | 1832675 B1 | 4/2013 |
| EP | 1683446 B1 | 7/2013 |
| EP | 2774807 A2 | 9/2014 |
| EP | 2489770 B1 | 1/2015 |
| EP | 2772576 B1 | 4/2015 |
| EP | 2230132 B1 | 5/2016 |
| EP | 2653598 B1 | 7/2016 |
| EP | 3210487 A1 | 8/2017 |
| EP | 2792776 B1 | 10/2017 |
| EP | 2792775 B1 | 11/2017 |
| EP | 2848721 B1 | 1/2018 |
| EP | 3305500 A1 | 4/2018 |
| EP | 2751312 B1 | 7/2018 |
| EP | 3064627 B1 | 8/2018 |
| EP | 3064628 B1 | 8/2018 |
| EP | 2894246 B1 | 10/2018 |
| EP | 2966206 B1 | 11/2018 |
| EP | 3256632 B1 | 3/2019 |
| EP | 3255192 B1 | 1/2020 |
| EP | 3779017 A1 | 2/2021 |
| EP | 3826820 A1 | 6/2021 |
| EP | 3889332 A1 | 10/2021 |
| EP | 3610760 B1 | 11/2021 |
| EP | 3974572 A1 | 3/2022 |
| ES | 2335962 A1 | 4/2010 |
| ES | 2335962 B1 | 4/2010 |
| ES | 2346180 T3 | 10/2010 |
| FR | 2432108 A1 | 2/1980 |
| FR | 2596626 A1 | 10/1987 |
| FR | 2675440 B1 | 12/1993 |
| FR | 2850260 A1 | 7/2004 |
| FR | 3050409 B1 | 10/2017 |
| FR | 3063461 B1 | 3/2019 |
| FR | 3109753 B1 | 11/2021 |
| GB | 721866 A | 1/1955 |
| GB | 1009799 A | 11/1965 |
| GB | 2275695 A | 9/1994 |
| GB | 2576141 A | 2/2020 |
| GB | 2577591 B | 4/2021 |
| GB | 2589497 B | 11/2021 |
| GB | 2628886 A | 10/2024 |
| IN | 201717042989 A | 3/2018 |
| IN | 336480 B | 5/2020 |
| IN | 202047045846 A | 10/2020 |
| IN | 351780 B | 11/2020 |
| IN | 382056 B | 11/2021 |
| IN | 202117027707 A | 11/2021 |
| JP | S556515 A | 1/1980 |
| JP | S5517527 A | 2/1980 |
| JP | H04286627 A | 10/1992 |
| JP | H0861414 A | 3/1996 |
| JP | H1046185 A | 2/1998 |
| JP | H115282 A | 1/1999 |
| JP | H11350326 A | 12/1999 |
| JP | 2000004993 A | 1/2000 |

(56) References Cited

FOREIGN PATENT DOCUMENTS

| | | |
|---|---|---|
| JP | 2001046185 A | 2/2001 |
| JP | 2001055719 A | 2/2001 |
| JP | 2001061612 A | 3/2001 |
| JP | 2001070106 A | 3/2001 |
| JP | 2001310378 A | 11/2001 |
| JP | 2001329631 A | 11/2001 |
| JP | 2002084894 A | 3/2002 |
| JP | 2002087879 A | 3/2002 |
| JP | 2002088636 A | 3/2002 |
| JP | 2003250667 A | 9/2003 |
| JP | 2003251089 A | 9/2003 |
| JP | 2003268668 A | 9/2003 |
| JP | 2004202858 A | 12/2003 |
| JP | 3686690 B2 | 8/2005 |
| JP | 3686692 B2 | 8/2005 |
| JP | 2006006924 A | 1/2006 |
| JP | 2006200117 A | 8/2006 |
| JP | 2006200119 A | 8/2006 |
| JP | 2006200120 A | 8/2006 |
| JP | 2007098013 A | 4/2007 |
| JP | 4181878 B2 | 11/2008 |
| JP | 2009090089 A | 4/2009 |
| JP | 4350285 B2 | 10/2009 |
| JP | 4350286 B2 | 10/2009 |
| JP | 4350287 B2 | 10/2009 |
| JP | 2011045424 A | 3/2011 |
| JP | 2011152779 A | 8/2011 |
| JP | 2011177413 A | 9/2011 |
| JP | 4835150 B2 | 12/2011 |
| JP | 4907991 B2 | 4/2012 |
| JP | 2012115515 A | 6/2012 |
| JP | 5165809 B1 | 3/2013 |
| JP | 2013091862 A | 5/2013 |
| JP | 5339107 B1 | 11/2013 |
| JP | 5418741 B1 | 2/2014 |
| JP | 2014038151 A | 2/2014 |
| JP | 5454733 B1 | 3/2014 |
| JP | 5454734 B1 | 3/2014 |
| JP | 2014064767 A | 4/2014 |
| JP | 5532178 B1 | 6/2014 |
| JP | 5532179 B1 | 6/2014 |
| JP | 2014104050 A | 6/2014 |
| JP | 5569641 B1 | 8/2014 |
| JP | 2015205611 A | 11/2015 |
| JP | 5868964 B2 | 2/2016 |
| JP | 2016028900 A | 3/2016 |
| JP | 2016036972 A | 3/2016 |
| JP | 5909581 B1 | 4/2016 |
| JP | 5976511 B2 | 8/2016 |
| JP | 5986584 B2 | 9/2016 |
| JP | 5990194 B2 | 9/2016 |
| JP | 2016189879 A | 11/2016 |
| JP | 6182249 B2 | 8/2017 |
| JP | 2017150100 A | 8/2017 |
| JP | 6228278 B2 | 11/2017 |
| JP | 6294140 B2 | 3/2018 |
| JP | WO2016189879 A1 | 3/2018 |
| JP | 6311918 B2 | 4/2018 |
| JP | 6311919 B2 | 4/2018 |
| JP | 6318643 B2 | 5/2018 |
| JP | 6347492 B2 | 6/2018 |
| JP | 6527602 B2 | 6/2019 |
| JP | 6566900 B2 | 8/2019 |
| JP | 2019173217 A | 10/2019 |
| JP | 2019173218 A | 10/2019 |
| JP | 2019189972 A | 10/2019 |
| JP | 2019210565 A | 12/2019 |
| JP | 6661666 B2 | 3/2020 |
| JP | 2020045589 A | 3/2020 |
| JP | 2020090648 A | 6/2020 |
| JP | 6725823 B2 | 7/2020 |
| JP | 2020127523 A | 8/2020 |
| JP | 2020156629 A | 10/2020 |
| JP | 6786500 B2 | 11/2020 |
| JP | 2020192164 A | 12/2020 |
| JP | 6819297 B2 | 1/2021 |
| JP | 2021045365 A | 3/2021 |
| JP | 6863537 B2 | 4/2021 |
| JP | 6909823 B2 | 7/2021 |
| JP | WO2020090648 A1 | 10/2021 |
| JP | 7002010 B2 | 2/2022 |
| JP | 7158968 B2 | 10/2022 |
| KR | 200207612 Y1 | 1/2001 |
| KR | 101141773 B1 | 5/2012 |
| KR | 101250622 B1 | 4/2013 |
| KR | 20130067823 A | 6/2013 |
| KR | 20170017488 A | 2/2017 |
| KR | 101717488 B1 | 3/2017 |
| KR | 101722929 B1 | 4/2017 |
| KR | 101722932 B1 | 4/2017 |
| KR | 20170107554 A | 9/2017 |
| KR | 20170117085 A | 10/2017 |
| KR | 101829235 B1 | 2/2018 |
| KR | 101928730 B1 | 3/2019 |
| KR | 101961514 B1 | 3/2019 |
| KR | 101983204 B1 | 5/2019 |
| KR | 102002393 B1 | 7/2019 |
| KR | 102083055 B1 | 2/2020 |
| KR | 102137446 B1 | 7/2020 |
| KR | 102148214 B1 | 8/2020 |
| KR | 102227060 B1 | 3/2021 |
| KR | 20210076130 A | 6/2021 |
| NL | 1032699 C2 | 4/2008 |
| WO | 1992018224 A1 | 10/1992 |
| WO | 1995015768 A1 | 6/1995 |
| WO | 1997002377 A1 | 1/1997 |
| WO | 2000047801 A1 | 8/2000 |
| WO | 2000071382 A1 | 11/2000 |
| WO | 01068967 A1 | 9/2001 |
| WO | 2002061217 A1 | 8/2002 |
| WO | 2004014690 A1 | 2/2004 |
| WO | 2004063450 A1 | 7/2004 |
| WO | 2005030011 A1 | 4/2005 |
| WO | 2006068120 A1 | 6/2006 |
| WO | 2009092153 A1 | 7/2009 |
| WO | 2010068854 A1 | 6/2010 |
| WO | 2010090093 A1 | 8/2010 |
| WO | 2011102951 A1 | 8/2011 |
| WO | 2012035736 A1 | 3/2012 |
| WO | 2012157289 A1 | 11/2012 |
| WO | 2013030400 A1 | 3/2013 |
| WO | 2013088736 A1 | 6/2013 |
| WO | 2013088737 A1 | 6/2013 |
| WO | 2013168699 A1 | 11/2013 |
| WO | 2014038151 A1 | 3/2014 |
| WO | 2014080614 A1 | 5/2014 |
| WO | 2014132484 A1 | 9/2014 |
| WO | 2015050134 A1 | 4/2015 |
| WO | 2015064523 A1 | 5/2015 |
| WO | 2015064557 A1 | 5/2015 |
| WO | 2015163188 A1 | 10/2015 |
| WO | 2016125766 A1 | 8/2016 |
| WO | 2016130602 A1 | 8/2016 |
| WO | 2016177425 A1 | 11/2016 |
| WO | 2016189879 A1 | 12/2016 |
| WO | 2017119157 A1 | 7/2017 |
| WO | 2017122370 A1 | 7/2017 |
| WO | 2018068451 A1 | 4/2018 |
| WO | 2017199474 A1 | 2/2019 |
| WO | 2019036559 A1 | 2/2019 |
| WO | 2019188090 A1 | 10/2019 |
| WO | 2019230304 A1 | 12/2019 |
| WO | 2020021263 A1 | 1/2020 |
| WO | 2020090648 A1 | 5/2020 |
| WO | 2020111110 A1 | 6/2020 |
| WO | 2020116327 A1 | 6/2020 |
| WO | 2020245670 A1 | 12/2020 |
| WO | 2021074601 A1 | 4/2021 |
| WO | 2021122937 A1 | 6/2021 |
| WO | 2021141601 A1 | 7/2021 |
| WO | 2020045589 A1 | 8/2021 |
| WO | 2022097435 A1 | 5/2022 |
| WO | 2023101995 A2 | 6/2023 |
| WO | 2023122018 A2 | 6/2023 |

(56) References Cited

FOREIGN PATENT DOCUMENTS

| | | |
|---|---|---|
| WO | 2023172483 A1 | 9/2023 |
| WO | 2023204905 A1 | 9/2023 |
| WO | 2023220261 A1 | 11/2023 |
| WO | 2023244721 A1 | 12/2023 |
| WO | 2023250026 A1 | 12/2023 |
| WO | 2024006134 A1 | 1/2024 |
| WO | 2024006143 A1 | 1/2024 |
| WO | 2024097012 A1 | 5/2024 |
| WO | 2024136943 A1 | 6/2024 |

OTHER PUBLICATIONS airstring.com, About Airstring, Jan. 18, 2021, 13 pages.
http://airstring.com, Introducing Airstring The Future of Cushioning, 2016, 13 pages.
https://www.toyobo-global.com/seihin/breathair/breathair_youto.htm, Applications, Sep. 10, 2019, 5 pages.
https://www.toyobo-global.com/seihin/breathair_youto.htm, Toyobo Breathair, Cushion Materials, 1996-2013, 3 pages.
https://www.youtube.com/watch?v=eFiPBu_fBe4, The Making of a Newton Wovenaire Crib Mattress—YouTube, 3 Pages, Apr. 21, 2016.
Www.newtonbaby.com pages design, Borninwater, designed to breathe, Jan. 28, 2021, 11 pages.

\* cited by examiner

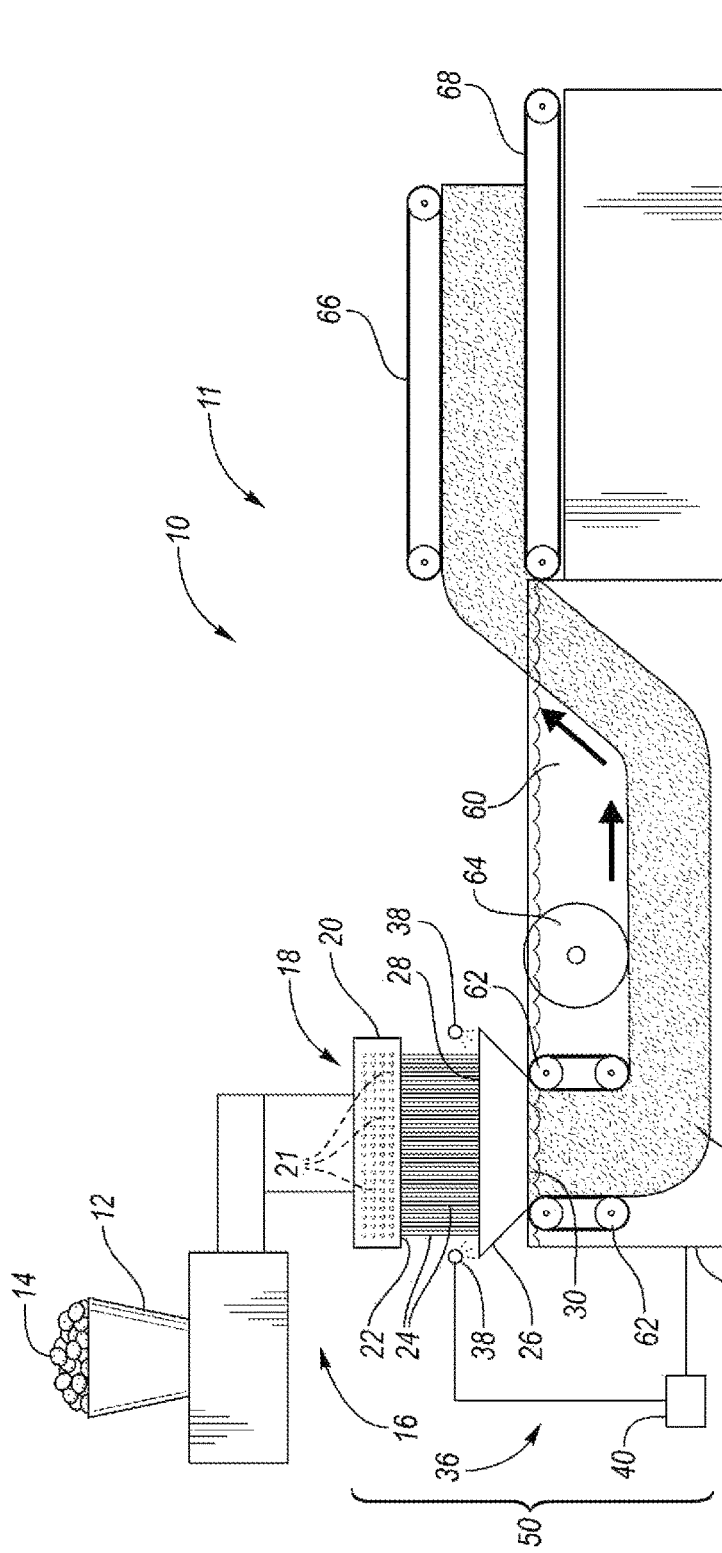
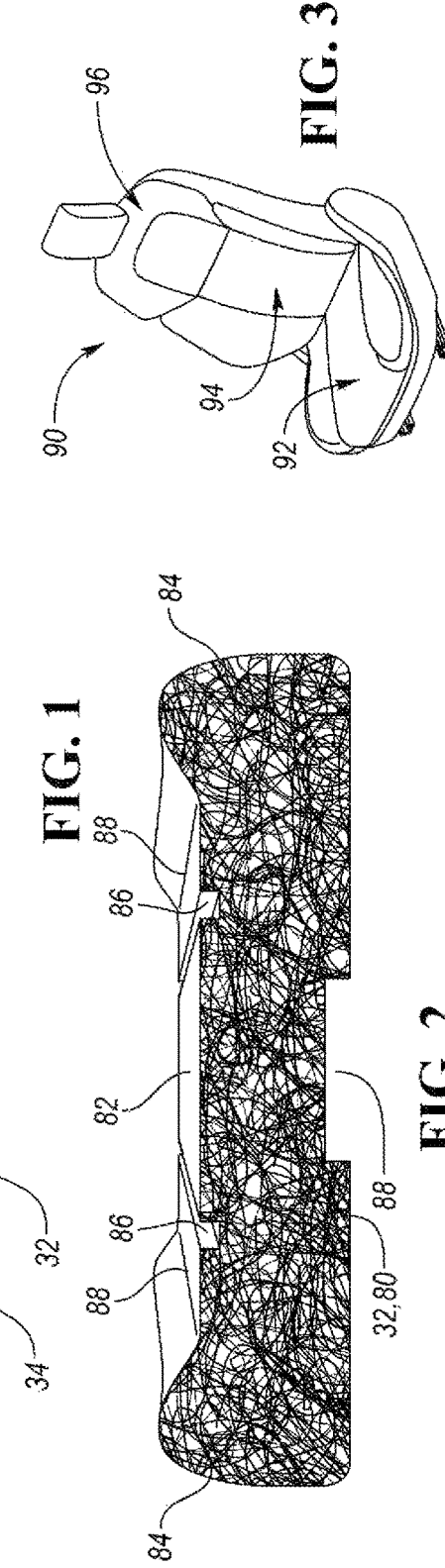
FIG. 1
FIG. 2
FIG. 3

METHOD AND APPARATUS FOR PRODUCING A VEHICLE INTERIOR COMPONENT

TECHNICAL FIELD

Various embodiments relate to a method, system, and assembly for producing a vehicle interior component such as a nonfoam cushion.

BRIEF DESCRIPTION OF THE DRAWINGS

FIG. 1 shows a schematic illustration of a system and method in accordance with embodiments described herein;

FIG. 2 shows a consolidated filament structure for an interior component and for use as a cushion blank for a vehicle seat formed in accordance with embodiments described herein;

FIG. 3 is a front perspective view of a seat assembly according to an embodiment and with an interior component formed in accordance with embodiments described herein;

DETAILED DESCRIPTION

Figure 4:
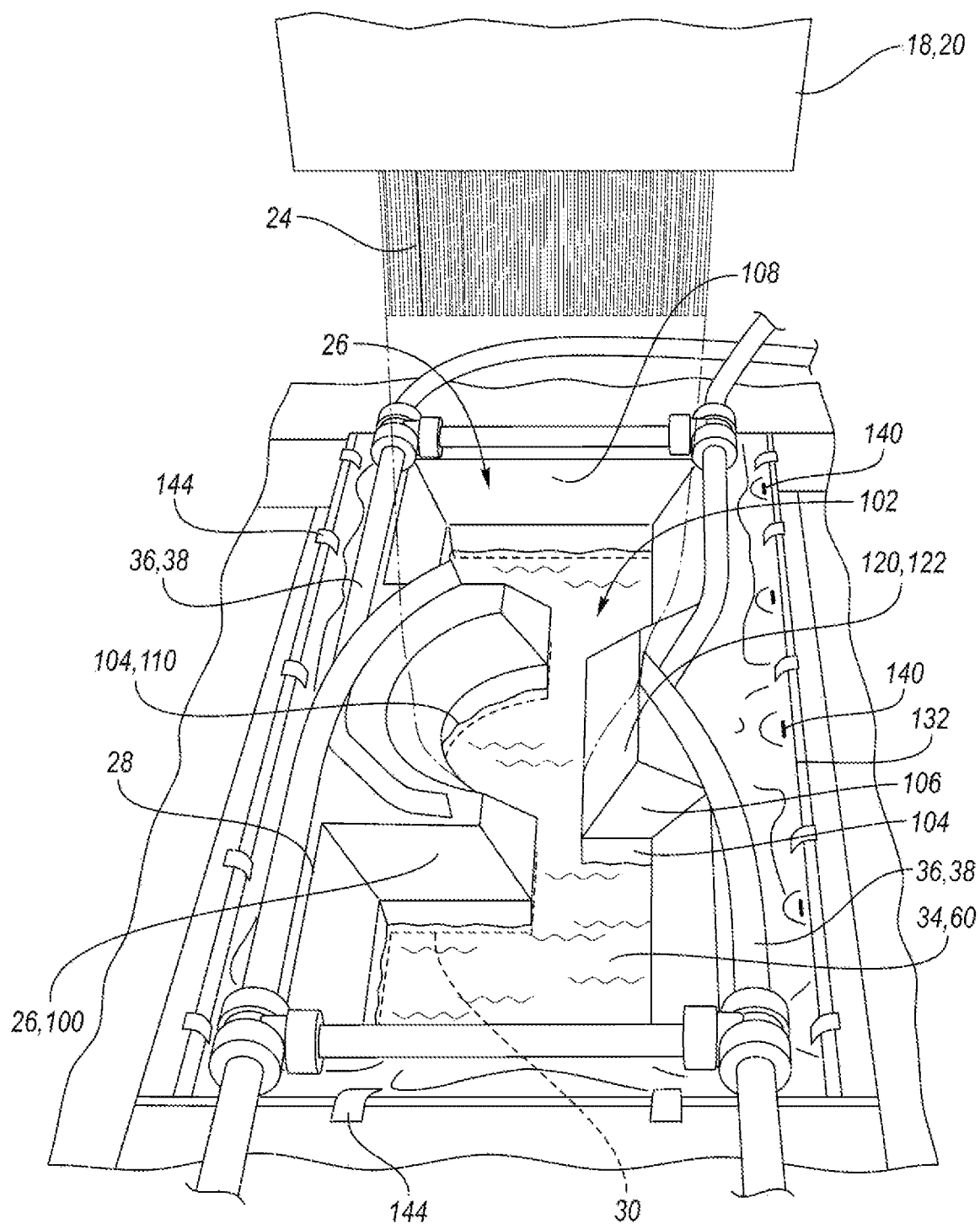
FIG. 4 is a perspective view of an assembly with a funnel and liner according to an embodiment, and for use with the system and method of FIG. 1.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Referring to FIG. 1, a schematic illustration of a system 10 usable with a method 11 in accordance with embodiments described herein is shown. A hopper 12 holds solid granules of a polymeric material 14 that is to be extruded. In this embodiment, the material 14 is linear low-density polyethylene (LLDPE), although methods described herein may use different types of polymers or thermoplastic resins as desirable and effective to produce the finished product. The material 14 is fed from the hopper 12 to an extruder 16. The extruder 16 melts and transports the material 14 to a die 18, which includes a die plate 20. The extruder 16 may be, for example, a conventional extruder that includes a barrel that receives a rotatable screw. Rotation of the screw forces the material 14 to move through the barrel and helps heat the material because of the friction generated as the screw rotates. Heating elements may be disposed on the barrel and heat the polymeric material 14 inside the barrel.

The material 14 exits the extruder 16 at location 22 under pressure and in a molten state, e.g. as a pressurized molten thermoplastic resin. Unless otherwise stated, the term "molten" as used herein means that the material is at least partially melted. It does not mean that the material is necessarily in a fully liquid state; rather, it means that the material is not completely solid and is still able to flow through elements of the system 10. For example, the molten material is still able to flow through the die plate 20, but it may be very viscous and starting to solidify. Once the solid granules of the polymeric material 14 are melted in the extruder 16, the material will begin to cool as it ceases to be agitated by the extruder screw and gets farther from any heaters. At different points in the process 11, the material may have a higher or lower viscosity, but if it is still partially melted and able to flow—even slowly—the term "molten" is applied herein.

The die plate 20 extrudes the material 14 into filaments 24 or strands 24. More specifically, the die plate 20 has multiple apertures 21 or holes 21 disposed therethrough-only some of which are labeled in FIG. 1 for clarity-through which the molten material 14 passes. A single filament 24 or strand is extruded from each aperture 21 of the die 18. The filaments 24 fall downward from the die plate 20 under system pressure and the force of gravity to a funnel 26. The die 18 may be positioned adjacent to an entrance 28 to the funnel 26.

The funnel 26 helps consolidate or group the filaments 24 into a more compact arrangement in which the filaments 24 bend or loop, and each filament 24 contacts and bonds to at least one other filament 24 to form a porous mesh structure. In this embodiment, the funnel 26 has a funnel entrance 28 and a funnel outlet 30 that is smaller than the funnel entrance 28. More specifically, the funnel 26 is narrower at the funnel outlet 30 than at the funnel entrance 28. Individual separated filaments 24 enter the funnel entrance 28, the filaments 24 then bend, loop, buckle, and/or intersect within the profile defined by the funnel 26, move into contact with each other as they accumulate and slide down the funnel 26 toward the funnel outlet 30, and the consolidated filament structure 32 exits the funnel outlet 30 and enters a fluid bath 34, or water tank 34. When the filaments 24 reach the funnel 26, those filaments near the outer part of the funnel 26—approximately 1-3 rows—may slide down an angled surface of the funnel 26, which may create a skin on the consolidated filament structure 32. The consolidated filament structure 32 may also be known as or referred to as a stranded mesh material member 32, as used herein.

The funnel 26 may be partially submerged in the fluid bath 34. For example, the funnel 26 may be positioned with the outlet 30 submerged in the fluid bath 34, and the entrance 28 positioned outside the fluid bath 34 and above the outlet 30.

A wetting system 36 is provided for the funnel 26, and may include at least one hose 38 positioned adjacent to the entrance 28 to the funnel 26 that directs fluid towards the funnel 26 to wet the funnel 26 as described below. The at least one hose 38 may be in fluid communication with the fluid bath 34, and a pump 40 may be provided. The at least one hose 38 may be provided with multiple outlet port, for example, as small apertures through the hose itself so that it weeps onto the funnel 26, or with spray nozzles connected to the hose and directing fluid from the hose towards the funnel 26.

The funnel 26 is described in further detail below, and may be used to provide a desired shape for the consolidated filament structure 32. The funnel 26 may be a part of an assembly 50 for the system 10, with the assembly 50 including the funnel 26 along with the die 18, fluid bath 34, and/or wetting system 36.

The fluid bath 34 holds a fluid 60, such as a liquid fluid or liquid water 60, and receives the consolidated filament structure 32 from the funnel 26. The fluid 60 performs at least two functions. First, it helps to temporarily support the consolidated filament structure 32 to prevent it from collapsing or condensing into a less open or less porous arrangement. As such, the water 60 provides some resistance that causes the additional bending, looping, buckling, and intersecting of the filaments 24 to further build the consolidated filament structure 32. Second, the water 60 cools the polymeric filaments 24 from the outside to solidify them. The temperature of the water 60 may be much less than the temperature of the filaments 24 as they leave the die plate 20, for example, it may be at the temperature of the ambient environment surrounding the tank 34. Although the fluid used in this embodiment is liquid water 60, in other embodiments, other types of fluids may be used.

The fluid bath 34 includes various rollers and conveyors that help move the consolidated filament structure 32 through and out of the water 60. A tractor conveyor 62 is submerged in the water 60 and engages opposing lateral sides of the consolidated filament structure 32 to move it away from the funnel 26 at approximately the same speed as the consolidated filament structure 32 exits the funnel 26. The gap between the opposing portions of the tractor conveyor 62 may be slightly narrower than the width of the consolidated filament structure 32 to allow the tractor conveyor 62 to better grip the consolidated filament structure 32. As previously noted, FIG. 1 is a schematic representation and has been simplified for illustration purposes. For example, a conveyor, such as the tractor conveyor 62, may be located toward the front and back of the system 10 as it is oriented in FIG. 1, rather on the left and right sides as shown.

Another roller 64 helps keep the consolidated filament structure 32 submerged and helps guide it through the water 60 toward a conveyor belt 66 and a shaker table 68 that are positioned outside of the fluid bath 34. The shaker table 68 shakes the consolidated filament structure 32 while it is on the conveyor belt 66 to remove at least some of the water 60. Pressurized air may also be blown toward the consolidated filament structure 32, which may also be squeezed to remove more of the water 60. Finally, the consolidated filament structure 32 may be cut to a desired size and shape.

The consolidated filament structure or stranded mesh material member is intended for use as a vehicle interior component. For example, the consolidated filament structure 32 may be used as a cushion blank or cushion member for part of a vehicle seat as described below with reference to FIG. 2, or as another interior component for a vehicle. The consolidated filament structure 32 may provide a non-woven thermoplastic cushion for a seat assembly. To reduce time and cost-particularly in postprocessing operations—the consolidated filament structure 32 may be formed with systems and methods described herein, e.g. with a funnel according to the present disclosure, to create a net- or near-net-shaped structure.

FIG. 2 shows a consolidated filament structure 32 or stranded mesh material member 32 forming a cushion blank 80, created using embodiments such as described above and for use as a seat cushion in a vehicle seat assembly. The cushion blank 80 may be formed with a base layer 82 bonded to, and/or formed as a skin 82 unitarily with, the plurality of strands. As shown in the Figure, and by way of one non-limiting example, the consolidated filament structure 32 may be formed with a contoured shape or cross-sectional profile with a complex geometry using the funnel 26 as described herein. The consolidated filament structure 32 was extruded and traveled through the funnel along an axis that extends into the page. The consolidated filament structure 32 may be formed with one or more convex regions 84, channels 86 or trenches 86, and/or concave regions 88.

In this way, the use of a funnel as described herein, may be used to create a consolidated filament structure having a desired shape. The consolidated filament structure 32 may be formed with different types of shapes useful for different applications. For example, the consolidated filament structure may be intended for use as a cushion blank for a vehicle interior component, such as a vehicle seat, and may be contoured for occupant support and comfort. For example, the consolidated filament structure may be formed with convex regions 84, e.g. for bolsters, or other concave or convex regions to form a desirable shape for a seated occupant. Additionally or alternatively, the consolidated filament structure may be formed with one or more channels 86 in a surface of the cushion blank, which may form a convenient location to attach a trim cover, or with concave regions 88 either for shaping or to locate a seat component, such as a bladder or other cushion member.

FIG. 3 illustrates a seat assembly 90 as a vehicle seat assembly 90 according to an embodiment. Although the vehicle seat assembly 90 is illustrated and described, any seat assembly 90 may be employed. The seat assembly 90 may be utilized in a land vehicle, aircraft, watercraft, or the like. The seat assembly 90 may also be utilized as an office chair, comfort chair, or the like.

The depicted seat assembly 90 includes a seat bottom cushion 92 to support a pelvis and thighs of a seated occupant. The seat assembly 90 also includes a seat back cushion 94 to support a back and shoulders of the seated occupant. The seat bottom cushion 92 and/or the seat back cushion 94 may each be formed from one or more cushion blanks 80 as described above. In one example, the cushions 92, 94 are formed from stranded mesh material cushion blanks such that they are non-foam cushions. In other examples, one or both of the cushions 92, 94 may be provided with one or more foam components such as a component formed from molded polyurethane foam, or other nonfoam components, in addition to the stranded mesh material nonfoam cushions. A trim cover 96 is provided over the seat cushions 92, 94 to conceal the cushions 92, 94 and provide a uniform and smooth contact surface for the occupant.

FIG. 4 illustrates an assembly 50 according to an embodiment and for use with the funnel according to an embodiment and for use with the system 10 and method of FIG. 1. Elements that are the same as or similar to those described above with reference to FIG. 1 are given the same reference numbers for simplicity.

The die 18 is illustrated with strands or filaments 24 extending downwardly from the series of apertures in the die plate 20 towards a funnel 26. As shown, the die 18 is positioned adjacent to and above an entrance 28 to the funnel.

The funnel 26 is positioned between the die 18 and the fluid bath 34. As shown, the funnel 26 is positioned with the outlet 30 submerged in the fluid bath 34 or below the fluid 60 level, and the entrance 28 is positioned outside the fluid bath 34 and above the outlet 30.

The funnel 26 has one or more side walls 100 that extend from the entrance 28 to the outlet 30 of the funnel. The outlet 30 has a smaller cross-sectional area than the entrance 28. The side walls 100 of the funnel form or defines an inner wall or inner surface for the funnel surrounding the central area 102. The side walls 100 may extend continuously about the central area 102 or interior region of the funnel. The side walls 100 may further provide a rigid support structure for the funnel from the entrance 28 to the outlet 30, e.g. as continuous, rigid support walls. The side walls 100 may be formed from shaped sheets of metal, plastic, or another material, formed using machining into a block of material such as metal or plastic, e.g. via milling, or may be formed using additive manufacturing or three-dimensional printing techniques.

The entrance 28 has an associated cross-sectional shape or profile, and the outlet has 30 an associated cross-sectional shape or profile. In various examples, and as shown, the shape of the entrance 28 generally corresponds to the shape of the outlet 30, e.g. with the entrance and outlet shapes differing in overall size, or scaled, relative to one another. In further examples, the shapes of the entrance 28 and outlet 30 may be varied or altered relative to one another, e.g. to cause a section of skin on the filament structure 32 to be directed in a specific manner, or when the funnel 26 contains complex shapes where a constant offset or scaling between the entrance 28 and outlet 30 for those features is unfeasible. The cross-sectional shapes of the entrance 28 and outlet 30, and the general cross-sectional shape of the funnel 26 may be formed to provide and shape the overall cross-sectional shape of the consolidated filament structure 32 or extruded member.

The cross-sectional shape of the funnel 26 defined by the side walls 100 may be a non-rectangular shape, and may further include concave shapes or surfaces 104 and/or convex shapes or surfaces 106, with planar sections 108 and/or curved sections 110, extending from the entrance 28 to the outlet 30. In one example, and as shown, the one or more side walls 100 of the funnel define at least one concave surface 104 and at least one convex surface 106.

Figure 5:
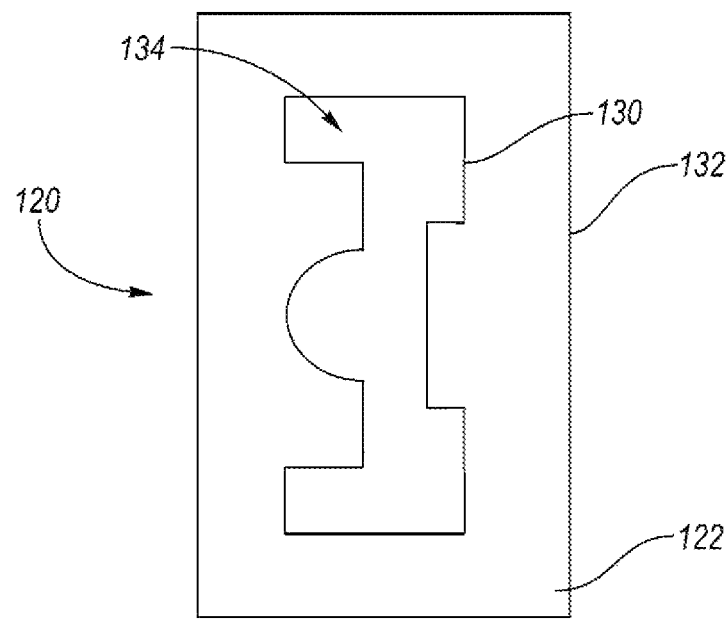
FIG. 5 is a top plan view of a liner according to an embodiment and for use with the system of FIG. 1 or the assembly of FIG. 4 prior to installation on a funnel.
Figure 6:
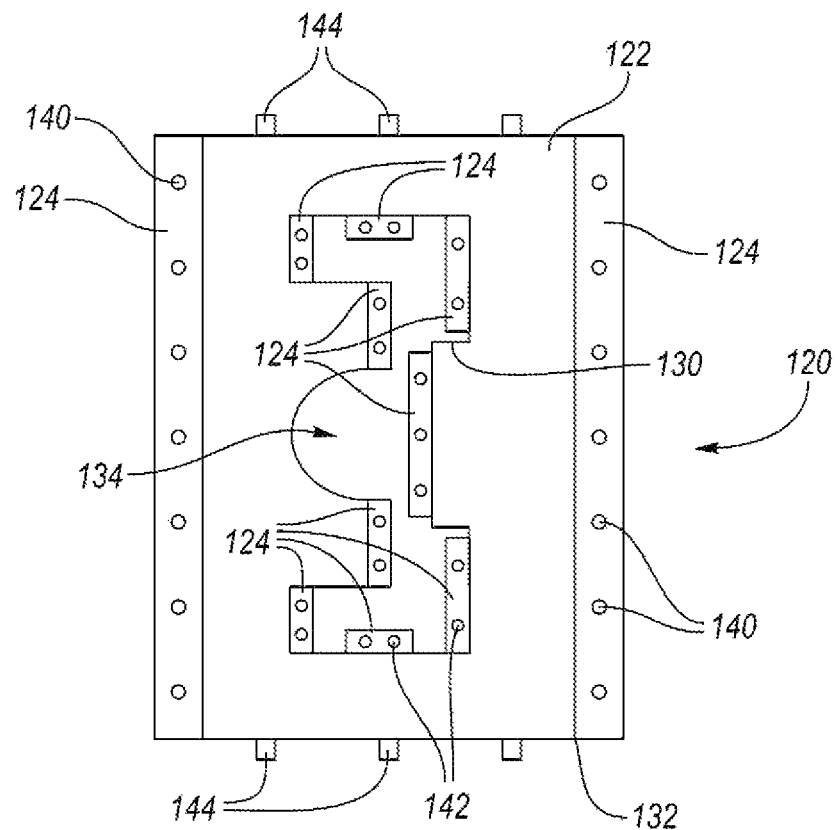
FIG. 6 is a top plan view of a liner according to another embodiment and for use with the system of FIG. 1 or the assembly of FIG. 4 prior to installation on a funnel.

With reference to FIGS. 4-6, a liner 120 is provided, and extends over or covering an inner surface of the one or more side walls 100 to line the interior region of the funnel 26. The liner 120 is stretched over the side walls 100 of the funnel 26, and is supported by the funnel. The liner 120 is stretched over the funnel 26 such that the liner 120 follows and conforms to the complex shape of the inner surface of the funnel 26, while avoiding wrinkles in the liner. The liner 120 may be formed from one or more panels as described below. For a liner 120 with multiple panels, the panels may be sewn, glued, or otherwise connected to one another.

The liner 120 comprises at least one elastic panel 122. The elastic panel 122 may be formed from a material with two-way or four-way stretch, and in one non-limiting example, is provided by a material with fifteen percent stretch in a direction. In one example, each elastic panel 122 is formed from or comprises a knit fabric. In other examples, each elastic panel 122 is formed from or comprises at least one of a polyester elastic material, elastane, nylon, natural fiber, and/or rubber core yarn. In further example, each elastic panel 122 may be formed from or comprise any other type of two-way or four-way stretch fabric.

For a liner 120 with more than one elastic panel 122, the elastic panels 122 may be formed from the same material, e.g. to account for complex funnel geometry 26, or may be formed from different elastic materials, or elastic materials with different properties from one another, e.g. to provide differing amount of stretch for different shaped regions of the funnel and/or account for complex funnel geometry.

In one example, the liner 120 is formed from only elastic panel(s) 122. In other examples, the liner 120 may include both elastic panel(s) 122 as well as non-elastic panel(s) 124. According to various examples, the non-elastic panel(s) 124 may be formed from a woven or non-woven fabric, including DUON, duck cloth or canvas, or another material with similar properties.

In one example, the liner 120 includes at least one nonelastic panel 124 adjacent to an inner edge 130 or an outer edge 132 to connect to associated fasteners as described below. In other examples, the liner 120 is formed from only elastic panel(s) 122, or the fasteners are connected directly to the elastic panel(s) 122.

In one example, the liner 120 has an inner edge 130 defining an aperture 134 therethrough, with the liner 120 extending outwardly from the inner edge 130 to an outer peripheral edge 132 of the liner. In one example, the inner edge 130 may generally correspond to the shape of the outlet 30 of the funnel, and/or the outer edge 132 may generally correspond to the entrance 28 of the funnel. In other examples, the shapes of the inner and outer edges 130, 132 differ from the cross-sectional shape of the funnel 26, for example, based on the location or type of fasteners used, to control stretch of the liner 120 in different regions of the funnel, or the like.

The liner 120 may be formed from a single panel or single sheet of material, with the inner and outer edges 130, 132 cut from the single panel, as described below with reference to FIG. 5. In other examples, the liner 120 may be formed from multiple panels that are connected to one another such that the liner may be used with a more complexly shaped funnel, and extend from an inner edge 130 to the outer edge 132.

One or more first fasteners 140 may be provided, and are connected adjacent to the outer edge 132 of the liner 120. The first fastener 140 may include at least one of a staple, clip, snap, grommet, hook, sewn-in wire or bead, hook or loop, tape, J-retainer, or the like.

One or more second fasteners 142 may also be provided, and are connected adjacent to the inner edge 130 of the liner 120. The second fastener 142 may include at least one of a staple, clip, snap, grommet, hook, sewn-in wire or bead, hook or loop, tape, J-retainer, or the like.

As described above, each first and/or second fastener 140, 142 may be directly connected to an elastic panel 122 of the liner 120, or may be attached is a non-elastic panel 124 at an inner edge 130 or outer edge 132 of the liner that is used to support the associated fastener. Furthermore, the liner 120 may use different types of fasteners in different regions of the funnel 26. Additionally, a mixture of fasteners as first fasteners 140 and/or second fasteners 142 may be used, e.g. with corresponding hook and loop fasteners positioned between hook and grommet fasteners to maintain stretch and positioning of the liner between adjacent hooks and grommets.

In one example, and as described further below with reference to FIG. 8, the liner 120 is connected to itself, e.g. by wrapping the liner 120 around the funnel 26, and with the inner edge 130 connected to the outer edge 132 away from the interior region 102 of the funnel. The first and second fasteners 140, 142 may therefore complement one another such that they are connected to one another to secure the liner 120 relative to the funnel 26, e.g. with a hook cooperating with a grommet, a sewn-in wire or bead cooperating with a hook, hook and loop fasteners, corresponding J-retainers, or the like. Alternatively, only a single fastener 140, 142 may be used, e.g. with a staple connecting the inner and outer edges 130, 132 of the liner 120 to one another.

In another example, and as shown in FIG. 4 and alternatively below with reference to FIG. 8, the liner 120 is connected to the funnel 26 itself, with the inner edge 130 of the liner 120 connected to the funnel 26 and the outer edge 132 of the liner 120 connected to the funnel 26 away from the interior region 102 of the funnel 26. In one example, each first fastener 140 connects to the funnel 26 adjacent to and outboard of the entrance 28, and each second fastener 142 connects to the funnel 26 adjacent to and outboard of the outlet 30. The first fastener(s) 140 of the liner 120 may connect to a corresponding fastener 150 provided on the funnel 26, and the second fastener(s) 142 of the liner 120 may likewise connect to another corresponding fastener 150 on the funnel 26. The fasteners 150 on the funnel 26 may be provided as described above with respect to fasteners 140, 142, and connected to or otherwise supported by the funnel 26. In one example, there are separate sets of fasteners 150 connected to the funnel 26 to cooperate with the first and second fasteners 140, 142. In another example, the first and second fasteners 140, 142 may directly connect to the funnel 26 itself, e.g. via a staple or rivet or the like through the liner 120 and into the funnel 26 material. In the example shown, tags 144 are connected, e.g. sewn, to the elastic panel(s) 122 of the liner 120 on the left hand side of FIG. 4. In one example, fasteners 140 may be connected to the tags 144 to connect the liner 120 to the funnel 26. The tags 144 may be formed from a nonelastic material as described above, and may further be used to pull and stretch the liner 120 when connecting the liner 120 to the funnel 26. In the example shown, staples are used as fasteners 140 to directly connect the liner 120 to the funnel 26 on the right hand side of FIG. 4.

Figure 7:
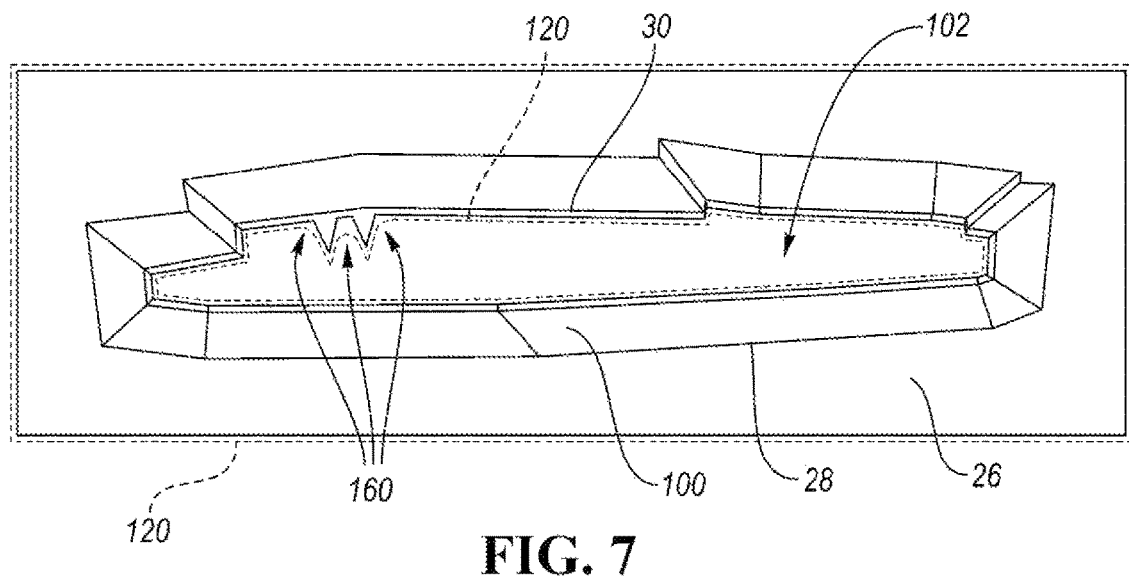
FIG. 7 is a top view of a funnel and liner according to another embodiment and for use with the system of FIG. 1 or the assembly of FIG. 4.

With reference to FIGS. 4 and 7, and for a funnel 26 with a cross-sectional shape having a concave corner 104 or stepped feature, the elastic panel(s) 122 of the liner 120 may provide a softened edge or curve when attached to the funnel 26, e.g. by providing a fillet 160 as the elastic material may stretch across the corner 104 itself, thereby providing an associated filleted shape for the consolidated filament structure 32 that is extruded therethrough. The radius of the fillet 160 may be controlled based on how tightly the elastic panel(s) 122 are stretched over the funnel 26 and over the associated corner 104, with a more tightly stretched liner 120 providing a smaller radius fillet or sharper feature.

The fluid system 36 is shown with the at least one hose 38 positioned adjacent to the entrance 28 to the funnel 26 to wet the liner 120 and funnel 26, e.g. by spraying or otherwise directing fluid from the hose 38 to the liner 120 of the funnel 26. In the example shown, the hose 38 is positioned above the liner 120 and funnel 26. In other examples, the hose 38 may be positioned between the liner 120 and the funnel 26, or in a combination of above and beneath the liner 120. The at least one hose 38 is in fluid communication with the fluid bath 34 such that fluid from the bath is directed to the funnel 26 and liner 120 and then returns to the bath 34 and circulates. The liner 120 and associated panels absorb and wick fluid or water even while stretched or under strain such that they remain wetted as the extruded strands 24 or filaments pass over them.

FIG. 5 illustrates a liner 120 formed from a single panel 122 of an elastic material. In FIG. 5, the liner 120 extends from an inner edge 130 surrounding an aperture 134 to an outer peripheral edge 132. The shapes of the inner and outer edges 130, 132 may generally correspond to one another and to the cross-sectional shape of the funnel 26, or may be different from one another. In the example shown, the outer edge 132 is generally rectangular, while the inner edge 130 corresponds to the cross-sectional shape of the funnel 26. The liner 120 may be cut from a single panel 122, with the aperture 134 and inner edge 130 cut from a central region of the panel 122. The liner 120 is then stretched over the funnel 26 to generally conform to the funnel 26 and provide the three-dimensional shape.

FIG. 6 illustrates a liner 120 formed from multiple panels, including an elastic panels 122, and multiple non-elastic panels 124. The liner 120 extends from an inner edge 130 surrounding an aperture 134 to an outer peripheral edge 132. The shapes of the inner and outer edges 130, 132 may generally correspond to one another and to the cross-sectional shape of the funnel 26, or may be different from one another as shown. The nonelastic panels 124 in the example shown are connected to the elastic panel(s) 122 and may provide support for first and second fasteners 140, 142, such as grommets or another fastener as disclosed herein.

The liner 120 may additionally be provided with tags 144 for fasteners or for use in stretching the liner. In edge regions without a fastener 140, 142 shown, the liner 120 may be directly connected to the funnel 26 or the liner 120 itself when assembled.

In another example, the liner 120 may additionally be provided with one or more non-elastic panels 124 to partially cover the inner surface of the funnel 26 itself, e.g. in a planar region 108 that does not require the liner 120 to stretch to conform to the funnel 26. In other examples, the liner 120 may be formed from one or more panels 122 of elastic material, and additionally, may include one or more nonelastic panels 124, either to partially cover the inner surface of the walls 100 of the funnel 26 in cooperation with the elastic panel(s) 122 and/or to provide support for the first and second fasteners 140, 142.

Figure 8:
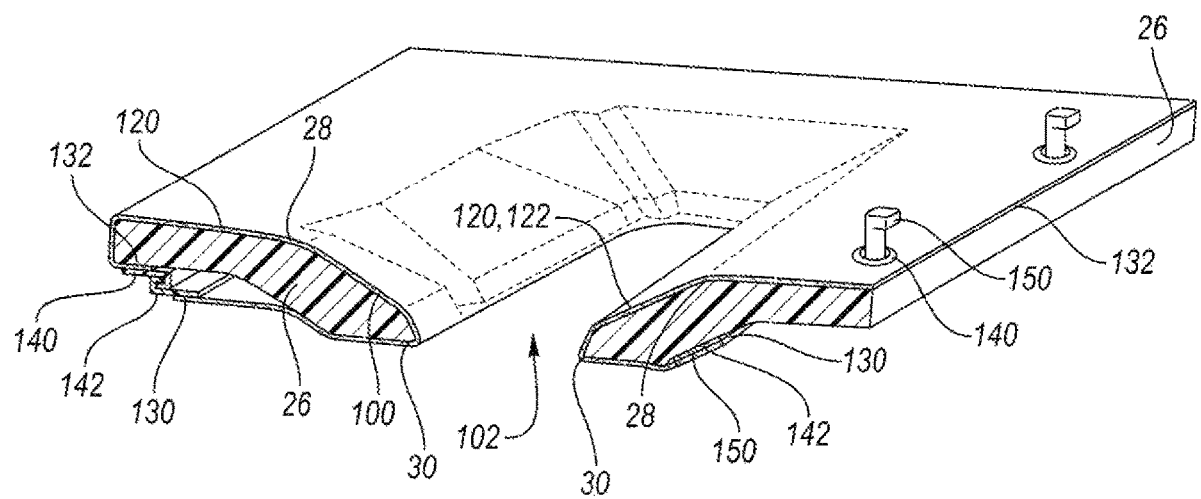
FIG. 8 is a perspective sectional view of the funnel and liner of FIG. 7 according to various embodiments.

FIGS. 7-8 illustrates a funnel 26 and liner 120 according to another embodiment, and for use with the assembly 50 of FIG. 2 or the system 10 and method of FIG. 1. Elements that are the same as or similar to those described above with reference to FIGS. 1-6 are given the same reference number for simplicity, and reference may be had to the description above. As shown, the funnel 26 has a complex cross-sectional shape with both concave regions 104 and convex regions 106. The side walls 100 extend from the entrance 28 to the outlet 30 of the funnel 26 to surround an interior region 102 of the funnel 26.

In FIG. 7, a top view of a funnel 26 is illustrated according to another embodiment, and showing a different cross-sectional shape for the funnel 26 and resulting extruded consolidated filament structure. The liner 120 is also shown in broken lines. As shown in FIG. 7, the liner 120 may provide a filleted shape 160 in conjunction with the funnel 26, depending on how much the liner is stretched over the funnel.

In FIG. 8, and by way of a non-limiting example, the liner 120 is shown as being connected to itself and wrapped around the funnel 26 on the left hand side of the Figure, and the liner 120 is connected to the funnel 26 on the right hand side of the Figure. The funnel 26 underlying the liner 120 is shown in broken lines. The inner edge 130 is pulled through and away from the outlet 30 of the funnel, and the outer edge 132 is stretched outwardly from the entrance 28. As shown in the Figure, the first and second fasteners 140, 142 on the left hand side of FIG. 8 are provided by corresponding J-retainers that are connected to one another. As shown in FIG. 8, and by way of example, first fasteners 140 on the right hand side of the Figure is a grommet and is connected to a corresponding hook 150 on the funnel, and the second fastener 142 on the right hand side of the Figure is hook or loop fastener and is connected to the other of a hook or loop fastener as fastener 150 on the funnel.

A method is provided. The method may be used with the system 10 of FIG. 1, or the assembly 50 of FIG. 4 according to various non-limiting examples.

An inner surface of the wall(s) 100 of a funnel 26 is covered with a liner 120 comprising one or more elastic panels 122. The liner 120 may be stretched when covering the funnel 26, e.g. by stretching the liner 120 over the inner surface of wall(s) 100 of the funnel to remove any wrinkles in the liner and provide a smooth liner surface. In a further example, the liner 120 may be steamed after it is stretched over the funnel to further remove wrinkles. The liner 120 is fastened to at least one of the funnel 26 and/or the liner 120 to connect or attach the liner 120 to the funnel 26, e.g. using fasteners 140, 142, 150 as described above.

The liner 120 is wetted, e.g. using a fluid system 36. A stranded mesh material member 32 is formed by extruding material as strands or filaments 24 from a die 18 and through the funnel 26, and into a fluid bath 34. The consolidated filament structure 32, also referred to as a stranded mesh material member 32, may then be cut to form a cushion 80 or a cushion blank or a vehicle interior component. In various examples, the cushion is attached to a seat assembly such as a vehicle seat assembly 90.

Clause 1. An assembly, in combination with, or without, any one or more of the successive clauses, comprising a funnel comprising one or more side walls extending from an entrance to an outlet; and a liner comprising one or more elastic panels, with the liner extending over an inner surface of the one or more side walls.

Clause 2. The assembly of any of the preceding or successive clauses wherein the liner comprises an inner edge defining an aperture therethrough, and extends outwardly from the inner edge to an outer edge.

Clause 3. The assembly of any of the preceding or successive clauses wherein the liner comprises a single panel.

Clause 4. The assembly of any of the preceding or successive clauses further comprising one or more first fasteners connected to the liner adjacent to the outer edge.

Clause 5. The assembly of any of the preceding or successive clauses further comprising one or more second fasteners connected to the liner adjacent to the inner edge.

Clause 6. The assembly of any of the preceding or successive clauses wherein each first fastener connects to a respective one of the second fasteners.

Clause 7. The assembly of any of the preceding or successive clauses wherein each first fastener and each second fastener connects to the funnel.

Clause 8. The assembly of any of the preceding or successive clauses wherein each first fastener connects to the funnel adjacent to the entrance, and wherein each second fastener connects to the funnel adjacent to the outlet.

Clause 9. The assembly of any of the preceding or successive clauses wherein the one or more panels comprise a knit fabric.

Clause 10. The assembly of any of the preceding or successive clauses wherein the one or more elastic panels comprises at least one of a polyester elastic material, elastane, nylon, natural fiber, and/or rubber core yarn.

Clause 11. The assembly of any of the preceding or successive clauses wherein the liner further comprises one or more non-elastic panels.

Clause 12. The assembly of any of the preceding or successive clauses wherein the one or more side walls of the funnel define at least one concave surface and at least one convex surface.

Clause 13. The assembly of any of the preceding or successive clauses further comprising a fluid bath, wherein the funnel is positioned with the outlet submerged in the fluid bath, and the entrance positioned outside the fluid bath and above the outlet.

Clause 14. The assembly of any of the preceding or successive clauses further comprising at least one hose in fluid communication with the fluid bath and positioned adjacent to the entrance of the funnel to wet the liner.

Clause 15. The assembly of any of the preceding or successive clauses further comprising a die positioned adjacent to the entrance to the funnel, with the die comprising a series of apertures therethrough.

Clause 16. A method of any of the preceding or successive clauses comprising covering an inner surface of a funnel with a liner comprising one or more elastic panels, wetting the liner, and forming a stranded mesh material member by extruding material from a die and through the funnel.

Clause 17. The method of any of the preceding or successive clauses further comprising stretching the liner when covering the funnel, and fastening the liner to at least one of the funnel and/or the liner to connect the liner to the funnel.

Clause 18. The method of any of the preceding or successive clauses further comprising cutting the stranded mesh material member to form a cushion, and attaching the cushion to a seat assembly.

Clause 19. A stranded mesh material member formed using the method of any of the preceding or successive clauses.

Clause 20. A system of any of the preceding or successive clauses comprising a die, a funnel assembly, and a fluid bath. The funnel assembly comprises a funnel comprising one or more side walls extending from an entrance to an outlet, with the entrance positioned to receive polymeric strands extruded from the die, and a liner comprising one or more elastic panels, the liner extending over an inner surface of the one or more side walls. The outlet of the funnel is submerged within the fluid bath, and the entrance is positioned above the fluid in the fluid bath. The system has at least one hose to direct fluid from the fluid bath onto the liner.

Clause 21. Any one of the preceding clauses 1-20 in any combination.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. An assembly, comprising:
a die;
a funnel comprising one or more side walls extending from an entrance to an outlet, wherein the die is positioned adjacent to and above the entrance to the funnel; and
a liner comprising one or more elastic panels, the liner conforms to a shape of an inner surface of the one or more side walls.

2. The assembly of claim 1, wherein the liner comprises an inner edge defining an aperture therethrough, and extends outwardly from the inner edge to an outer edge.

3. The assembly of claim 2, wherein the liner comprises a single panel.

4. The assembly of claim 2, further comprising one or more first fasteners connected to the liner adjacent to the outer edge.

5. The assembly of claim 4, further comprising one or more second fasteners connected to the liner adjacent to the inner edge.

6. The assembly of claim 5, wherein each first fastener connects to a respective one of the second fasteners.

7. The assembly of claim 5, wherein each first fastener and each second fastener connect to the funnel.

8. The assembly of claim 7, wherein each first fastener connects to the funnel adjacent to the entrance, and wherein each second fastener connects to the funnel adjacent to the outlet.

9. The assembly of claim 1, wherein the one or more elastic panels comprise a knit fabric.

10. The assembly of claim 1, wherein the one or more elastic panels comprises at least one of a polyester elastic material, elastane, nylon, natural fiber, and rubber core yarn.

11. The assembly of claim 1, wherein the liner further comprises one or more non-elastic panels.

12. The assembly of claim 1, wherein the one or more side walls of the funnel define at least one concave surface and at least one convex surface.

13. The assembly of claim 1, further comprising a fluid bath, wherein the funnel is positioned with the outlet submerged in the fluid bath, and the entrance positioned outside the fluid bath and above the outlet.

14. The assembly of claim 13, further comprising at least one hose in fluid communication with the fluid bath and positioned adjacent to the entrance of the funnel to wet the liner.

15. The assembly of claim 1, wherein the die comprising a series of apertures therethrough.

16. A system, comprising:
a die;
a funnel assembly comprising:
a funnel comprising one or more side walls extending from an entrance to an outlet, the entrance positioned to receive polymeric strands extruded from the die, and
a liner comprising one or more elastic panels, the liner extending over an inner surface of the one or more side walls;
a fluid bath, wherein the outlet of the funnel is submerged within the fluid bath, and the entrance is positioned above the fluid in the fluid bath; and
at least one hose to direct fluid from the fluid bath onto the liner.

17. The assembly of claim 1, wherein the one or more elastic panels are formed of a material with two-way or four-way stretch.

18. The assembly of claim 1, wherein a shape of the entrance of the funnel is different from a shape of the outlet of the funnel.

19. The system of claim 16, wherein the one or more side walls of the funnel define at least one concave surface and at least one convex surface.

* * * * *